United States Patent
Ratakonda et al.

(10) Patent No.: US 7,477,598 B2
(45) Date of Patent: Jan. 13, 2009

(54) ADAPTIVE STREAM SWITCHING WITH MINIMIZED SWITCHING DELAY

(75) Inventors: Krishna Ratakonda, Yorktown Heights, NY (US); Deepak S. Turaga, Elmsford, NY (US); Peter H. Westerink, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 637 days.

(21) Appl. No.: 11/090,616

(22) Filed: Mar. 25, 2005

(65) Prior Publication Data

US 2006/0215676 A1 Sep. 28, 2006

(51) Int. Cl.
*H04L 12/56* (2006.01)
(52) U.S. Cl. .................. 370/230; 370/412; 370/429; 370/431
(58) Field of Classification Search .................. None
See application file for complete search history.

(56) References Cited

U.S. PATENT DOCUMENTS

| | | | |
|---|---|---|---|
| 5,544,327 A * | 8/1996 | Dan et al. .................. 709/234 |
| 6,263,371 B1 * | 7/2001 | Geagan et al. .............. 709/231 |
| 6,600,787 B2 * | 7/2003 | Tsuboi .................. 375/240.25 |
| 2002/0021754 A1 * | 2/2002 | Pian et al. ............... 375/240.02 |
| 2002/0191116 A1 | 12/2002 | Kessler et al. |
| 2003/0055995 A1 * | 3/2003 | Ala-Honkola ............... 709/231 |
| 2003/0174243 A1 * | 9/2003 | Arbeiter et al. .......... 348/384.1 |
| 2004/0172478 A1 | 9/2004 | Jacobs et al. |
| 2004/0199653 A1 | 10/2004 | Amini et al. |
| 2004/0215802 A1 | 10/2004 | Amini et al. |
| 2004/0240390 A1 | 12/2004 | Seckin et al. |
| 2005/0213946 A1 * | 9/2005 | Braun ......................... 386/105 |

OTHER PUBLICATIONS

Thomas Wiegand, Gary Sullivan, Study of Final Committee Draft of Joint Video Specification, Joint Video Team (JVT) of ISO/IEC MPEG & ITU-T VCEG, Dec. 5-12, 2002, 6th meeting, Awaji, Island, 249 pages.

* cited by examiner

*Primary Examiner*—Wing F Chan
*Assistant Examiner*—Brian Roberts
(74) *Attorney, Agent, or Firm*—Keusey, Tutunjian & Bitetto, P.C; Anne V. Dougherty, Esq.

(57) ABSTRACT

A system and method that selects among multiple encodings of the same content to adapt to available bandwidth and meet delay constraints by minimizing the switching lag is disclosed. The system and method include one buffer serving multiple data streams and a switching device. The switching device switches between the multiple data streams and discards data from the buffer that does not belong to a new stream to eliminate switching lag after a switching decision has been made.

27 Claims, 4 Drawing Sheets

ADAPTIVE STREAM SWITCHING WITH MINIMIZED SWITCHING DELAY

BACKGROUND

1. Technical Field

The present invention relates to data stream processing, and more particularly to systems and methods for reducing switching delay or lag by reducing redundant or unneeded data in the streams.

2. Description of the Related Art

A stream is an encoding that includes a sequence of frames of different types. For example, in an MPEG encoded video stream, I, P, and B-frames can be distinguished. A stream creator (encoder) sends a complete stream that includes all the frame types to a sub-sampler. The sub-sampler blocks certain frame types or passes them on to a receiver.

The creator understands the streams and defines stream configurations that include certain frame types only. Because a configuration includes a sub-set of frame types, it can also be seen as a sub-sampled version of the complete stream. It is a function of the sub-sampler to block or pass incoming frames according to the stream configuration that is currently in use.

To allow for more adaptivity, a creator may encode not just a single stream, but multiple streams using the same source. These alternate encodings will be for different bit rates, allowing a sub-sampler more choices to match the receiver bandwidth, as it can choose between alternate encodings, each with a choice of sub-sampling configuration.

While the strategy of this simple example works reasonably well in practice, it has at least one serious disadvantage. For example, any switch to a new stream will be reflected in the transmitted bandwidth only after all packets (which may come from one or more different streams, based on previous decisions) in the buffer, before the current packet has been drained.

This leads to a switching lag between when the decision to reduce/increase the bit-rate is made and when it is actually reflected at the outgoing stream, during which time the buffer and network state can change significantly. This switching lag constrains any decision strategy to be overly conservative, thereby leading to poor system performance.

SUMMARY

A system and method that selects among multiple encodings of the same content to adapt to available bandwidth and meet delay constraints by minimizing the switching lag is disclosed. The system and method include one buffer serving multiple data streams and a switching device. The switching device switches between the multiple data streams and discards data from the buffer that does not belong to a new stream to eliminate switching lag after a switching decision has been made.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFFERED EMBODIMENTS

Exemplary embodiments include systems and methods that select among multiple encodings (streams) of the same content to adapt to available bandwidth and meet delay constraints. This is performed to improve the adaptation by minimizing switching lag. In one embodiment, one buffer is employed for these multiple streams, but once a switching decision is made, packets (data) are discarded which do not belong to the new stream from the buffer. This eliminates or reduces switching lag.

In another embodiment, any decision strategy is modified to consider that each stream now experiences different buffer fullness. Modified decision strategies are presented herein.

To minimize the switching lag, multiple buffers may be employed at the server, with one buffer for each stream. However, this may be impractical and inefficient as the number of streams grows, especially as multiple streams may include redundancies (e.g., redundant data). This problem is furthered by the presence of multiple clients.

Another approach may include using no buffer, and transmit packets directly as they arrive. However, it has been shown even in current video coding standards that the buffer provides a way for the server/encoder to smooth out the rate of transmission of bits/packets into the network, and is one important factor in streaming applications.

It should be understood that the elements shown in the FIGS. may be implemented in various forms of hardware, software or combinations thereof. Preferably, these elements are implemented in a combination of hardware and software on one or more appropriately programmed general-purpose digital computers having a processor and memory and input/output interfaces. For example, the invention may be implemented in software as program instructions tangibly embodied on a program storage device which is readable by a machine, wherein the program instructions are executable by the machine to perform method steps for reducing switching lag in a system that selects from among multiple encodings of the same content to adapt to available bandwidth and meet delay constraints, as described herein.

Figure 1:
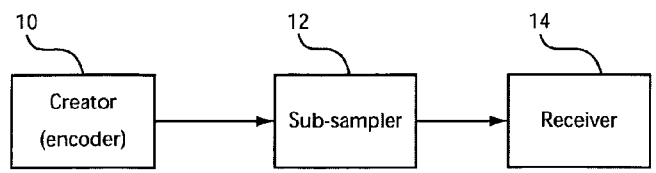
FIG. 1 is a block diagram of a transmission path for one or more data streams.

A stream is an encoding that includes a sequence of frames of different types. For example, in an MPEG encoded video stream, I, P, and B-frames can be distinguished. Referring now to the drawings in which like numerals represent the same or similar elements and initially to FIG. 1, a stream creator (encoder) 10 sends a complete stream that includes all the frame types to a sub-sampler 12. The sub-sampler blocks certain frame types or passes them on to a receiver 14.

The creator 10 understands the streams and defines stream configurations that include certain frame types only. Because a configuration includes a sub-set of frame types, it can also be seen as a sub-sampled version of the complete stream. It is a function of the sub-sampler 12 to block or pass incoming frames according to the stream configuration that is currently in use.

For example, in the case of MPEG video the creator 10 can define stream configurations $S_i$ depending on the number of B-frames, in accordance with Table 1:

TABLE 1

|  | 3 B-frames | | | | 2 B-frames | | | 1 B-frame | | | 0 B-frames | |
|---|---|---|---|---|---|---|---|---|---|---|---|---|
| $S_1$ | I | Be | Bo | Be | P | I | Be | Bo | P | I | Be | P | I | P |
| $S_2$ | I | Be | — | Be | P | I | Be | — | P | I | — | P | I | — |
| $S_3$ | I | — | Bo | — | P | I | — | — | P | I | — | — |
| $S_4$ | I | — | — | — | P | I | — | — | — |
| $S_5$ | I | — | — | — |

If in this example the creator 10 encodes an MPEG video stream with 1 B-frame, creator 10 tells the sub-sampler 12 that there are 3 different configurations possible, e.g.:

1. No sub-sampling, i.e. pass all frames;
2. Sub-sample by dropping all B-frames;
3. Sub-sample by passing only the I-frames to the receiver.

To allow for more adaptivity, a creator 10 may encode not just a single stream, but multiple streams using the same source. These alternate encodings will be for different bit rates, allowing a sub-sampler 12 more choice to match the receiver bandwidth, as it can choose between alternate encodings, each with a choice of sub-sampling configuration.

Figure 2:
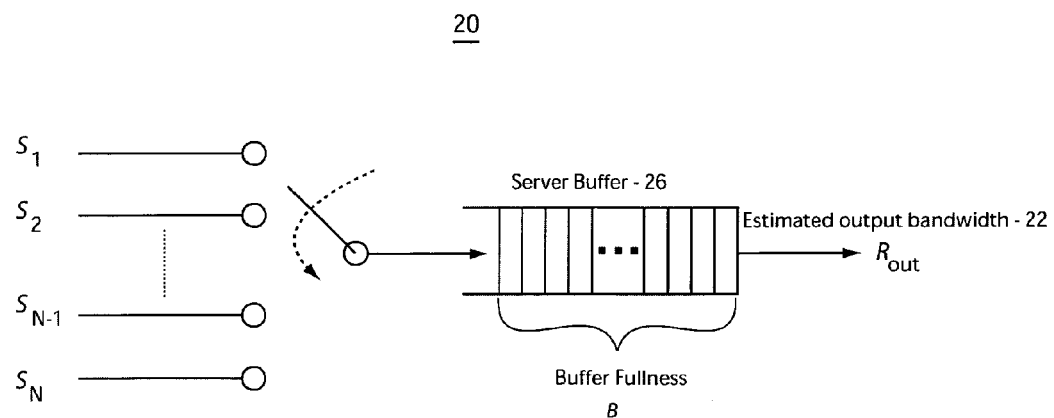
FIG. 2 is a schematic diagram of a buffer having a switched input stream to adjust bit rate at the output.

Referring to FIG. 2, stream switching is performed to adapt the multimedia content to varying network conditions. Consider a simple example where a server 20 has the option to select from among N streams $S_1$ through $S_N$. Further, let the streams have associated bit-rates $R_1$ through $R_N$, one of which will be selected for $R_{out}$. The server 20 selects one of these streams ($S_1$ through $S_N$) based on an estimate of available output bandwidth 22, and fullness (B) of a server buffer 26 (which controls the delay experienced by a client receiving the data/stream). This decision process is illustratively shown in FIG. 2.

A simple instantaneous decision strategy may be used to select the stream. The instantaneous strategy is one example of the different kinds of switching strategies that can be used. The present invention can also be used in conjunction with other switching strategies as well. Clearly, the delay experienced by a packet entering the buffer 26 at any time is a buffer drain delay ($\Delta$), e.g., the time needed to drain all packets in buffer 26 before the current packet. Clients have constraints on the maximum tolerable delay (D), and hence it is not desirable for this buffer drain delay to exceed D. The buffer drain delay may be estimated as $$\Delta = \frac{B}{R_{out}},$$

the buffer fullness (B) divided by the output rate ($R_{out}$). To be conservative, let the buffer drain delay be maintained at $\Delta < \alpha D$, where $\alpha$ is a conservative factor. Hence, if at any time, there is observed $\Delta \geq \alpha D$, a decision to switch to a stream with bit-rate lower than the output rate $R_{out}$ may be made. To make the switching as smooth as possible (in terms of content quality fluctuations), the stream with the largest bit-rate, still smaller than $R_{out}$ should be selected. Similarly a decision to switch up to a stream with a larger bandwidth can also be devised.

Figure 3:
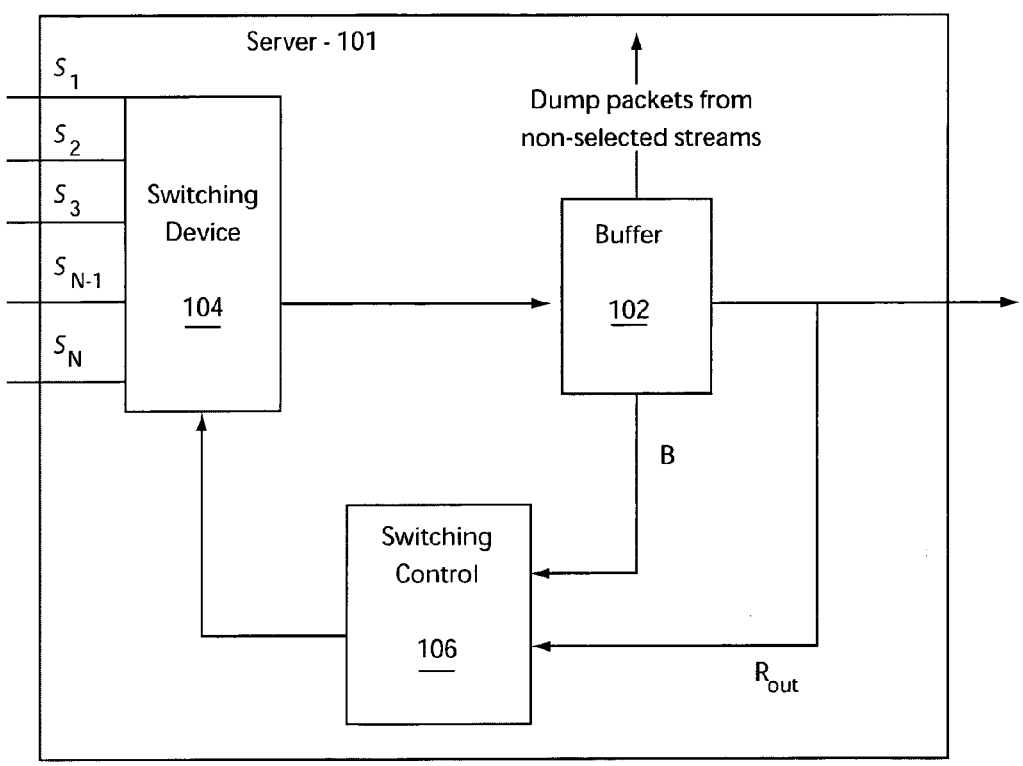
FIG. 3 is a block/flow diagram of a switching device controlled by a control circuit in accordance with buffer feedback.

Referring to FIG. 3, a system 100 includes a server 101 or other transmitter or receiving device. Server 101 will be referred to herein to indicate a device that receives or transmits a data stream. The data stream may include one or more different types of data in a plurality of different formats. In one embodiment, MPEG format may be employed however; any other format may be employed. Server 101 may be replaced with any other computer device, receiver, transmitter, processor or any other suitable device, which carries a data or multimedia stream.

Server or device 101 may include a single buffer or predetermined sized memory storage 102, which receives a plurality of streams from two or more channels or other media carrying streams (e.g., $S_1, S_2 \ldots S_N$). Each stream may carry the same content but may be encoded differently. In addition, the streams may be different encodings, e.g., at different bit-rates, of the content, or may be derived by the sub-sampler block 12 (FIG. 1) from one encoding.

A switching device 104 includes a switch or multiplexing capabilities to switch which stream (S) is connected to buffer 102. Switching device 104 may include a multiplexer/demultiplexer (MUX/DEMUX). A switching control circuit or logic 106 controls the switching device 104. Control circuit 106 receives updated information (B) on the capacity of the buffer 102 and an output rate or estimate of output bandwidth ($R_{out}$) to determine whether a switching decision is to be made.

In one embodiment, control circuit 106 determines an estimated buffer drain time $$\left(\text{e.g. } \Delta_i = \frac{B_i}{R_{out}}\right)$$

for each stream, and the decision to switch is made to account for this. A switch to the stream for which this estimated delay is smaller than $\alpha D$ is preferred. This may be written mathematically as:

Switch to stream $S_{\hat{i}}$ where $$\hat{i} = \underset{i}{\arg\max}(\Delta_i).$$
$$(\Delta_i < \alpha D)$$

As before, to minimize the content quality fluctuations, the stream that has the largest $\Delta_i$ that is less than the delay constraint $\alpha D$ may be selected.

Once a switching decision is made, packets in the buffer 102 that do not belong to the newly selected stream (after the switching) should be selectively dropped and not transmitted. Advantageously, this approach minimizes switching delay, while adding no redundancy and maintaining the desirable properties of having a buffer.

With such a method in place, the stream switching decision strategies have to be modified significantly, because each stream effectively experiences different buffer fullness. ($B_i$) corresponding to the total size of packets belonging to that stream already present in the buffer.

It should be noted that the selective dropping should be performed in an order that minimizes visual artifacts. For example in an MPEG format, packets corresponding to B frames are preferably dropped first as they are not used as reference by any other frames. Following this, P frames are preferably dropped, however, (among P frames), the system/ method may first drop the P frames closest (and prior) to an I frame so that error propagation is strictly limited. Finally, I frames should be dropped last, ensuring that they are dropped in increasing order of their display time (e.g. earliest I frames should be dropped first). Other methodologies are also contemplated for dropping order depending on the format or system being employed.

Figure 4:
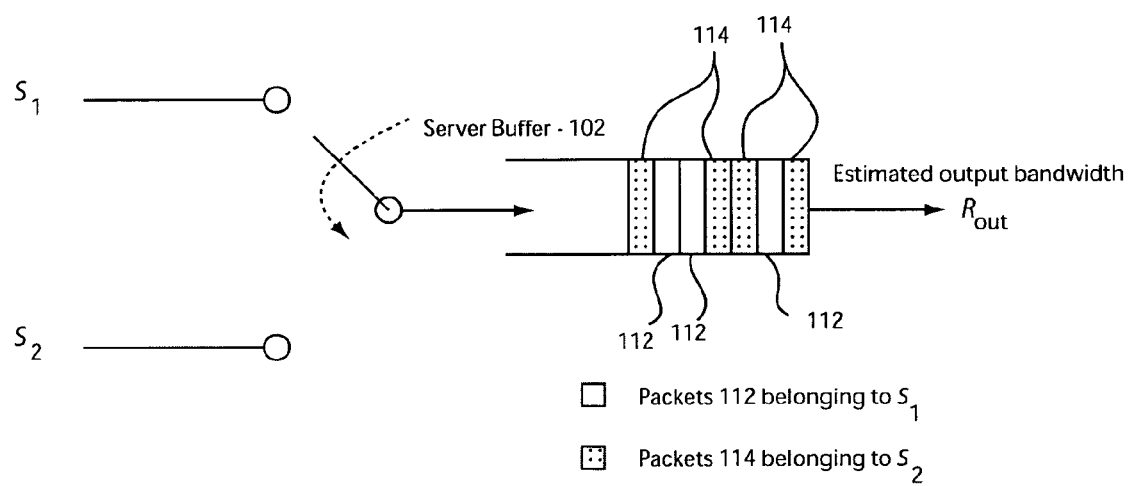
FIG. 4 is a schematic diagram of a buffer having a switched input stream to adjust bit rate at the output showing packets of two streams one set of packets being dropped to reduce switching lag.

Referring to FIG. 4, a simple example is shown to demonstrate aspects of the present invention. In this example, two streams $S_1$ and $S_2$ are available to be switched between and include the same content. The buffer 102 includes packets from both streams, packets 112 belong to $S_1$ and packets 114 belong to $S_2$. Hence, the buffer fullness $B_1$ experienced by any new packets from stream 1 is the sum of sizes of the shaded packets 112, and similarly the buffer fullness $B_2$ experienced by any new packet from stream 2 is the sum of the sizes of the textured packets 114.

Hence, the estimated buffer drain times $$\Delta_i = \frac{B_i}{R_{out}}$$

are different for each stream, and the decision to switch should be made to account for this. A switch to the stream for which this estimated delay is smaller than $\alpha D$ is preferred. This may be written mathematically as:

Switch to stream $S_i$ where $$\hat{i} = \underset{i}{\arg\max}(\Delta_i)$$
$$(\Delta_i < \alpha D)$$

As before, to minimize the content quality fluctuations, the stream that has the largest $\Delta_i$ that is less than the delay constraint $\alpha D$ is selected. Since the switching lag is reduced or eliminated, the decision process can be made less conservative, by increasing the parameter $\alpha$.

It is to be understood that the presented concepts are not restricted to a particular switching decision algorithm (e.g., instantaneous decision). There is a plurality of different but equally applicable methods or algorithms, which may be selected for use in accordance with the illustrative embodiments. For example, if the decision strategy is changed to account for future conditions, or changed in the manner in which the output rate, etc. are estimated different algorithms may be more appropriate and suitable and are contemplated.

Figure 5:
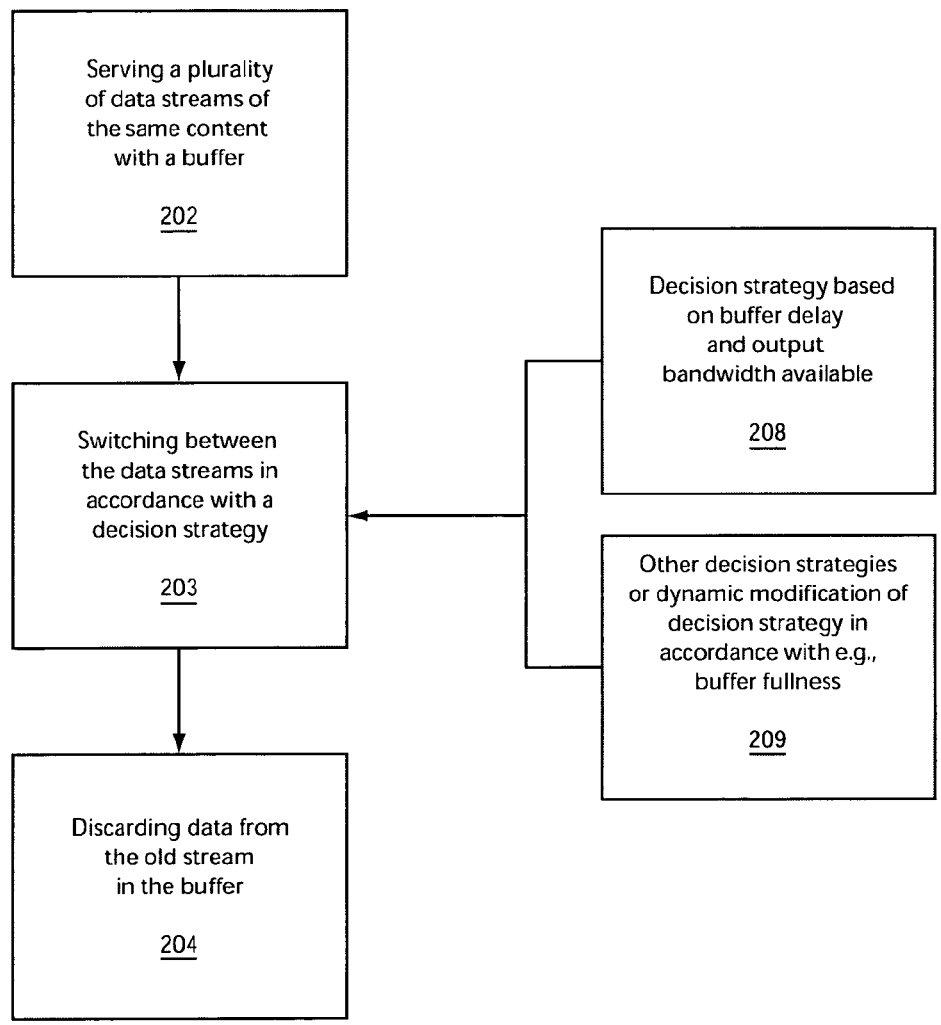
FIG. 5 is a block/flow diagram showing a system/method for buffering a switched input stream to adjust bit rate at the output to reduce switching lag.

Referring to FIG. 5, a method for reducing switching lag in a system that selects from among multiple encodings of the same content to adapt to available bandwidth and meet delay constraints is shown. In block 202, serving multiple data streams with one buffer is provided. Multiple buffers may also be employed, each serving a plurality of streams, but this may have the disadvantage of being inefficient for the server. In block 203, switching is performed between the multiple data streams, and data is discarded, in block 204 from the buffer that does not belong to a new stream to eliminate switching lag after a switching decision has been made.

The step of switching in block 203 may include switching between the multiple data streams in accordance with a decision strategy. The decision strategy may be modified to consider that each stream experiences a different buffer fullness. For example, the decision strategy may include measuring buffer delay. In one embodiment, the measurement of buffer delay includes evaluating buffer fullness and output bandwidth from the buffer in block 208. The measuring of buffer delay includes determining for each stream a buffer drain time. For each stream, a buffer drain time may include estimating buffer drain time by calculating $$\Delta_i = \frac{B_i}{R_{out}}$$

for each stream wherein the stream is switched to a stream depending on the decision strategy, for example, where the buffer drain time is largest, the buffer drain time is smaller than a maximum tolerable delay and/or the buffer drain time is smaller than a product of maximum tolerable delay and a weighting factor.

Other decision strategies may also be employed or may be modified dynamically in accordance with the state of the buffer, e.g., based on buffer fullness, in block 209.

Having described preferred embodiments of adaptive stream switching with minimized switching delay (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A system for selecting a stream with minimized switching lag, comprising:
   a switching device, which simultaneously receives at an input thereof a plurality of streams having a same content;
   a single buffer to receive a selected stream output from the switching device;
   a switching control device that controls the switching device to output one of the plurality of streams at the input of the switching device based on a measure of buffer delay by evaluating buffer fullness and output bandwidth from the buffer,
   wherein after a switching operation is performed to output a newly selected stream from the switching device, the buffer discards data packets stored therein that are not associated with the newly selected stream so as to eliminate switching lag.

2. The system as recited in claim 1, wherein the switching device includes a multiplexer.

3. The system as recited in claim 1, wherein the switching control device determines the measure of buffer delay by determining a buffer drain time for each stream.

4. The system as recited in claim 3, wherein the buffer drain time is estimated by $$\Delta_i = \frac{B_i}{R_{out}}$$

for each stream.

5. The system as recited in claim 4, wherein the switching control device switches to a stream where the buffer drain time is smaller than a maximum tolerable delay.

6. The system as recited in claim 4, wherein the switching control device switches to a stream where the buffer drain time is smaller than a product of maximum tolerable delay and a weighing factor.

7. The system as recited in claim 4, wherein the switching control device switches to a stream where the buffer drain time is largest.

8. A system that selects among multiple encodings of the same content to adapt to available bandwidth and meet delay constraints by minimizing the switching lag, comprising:
   one buffer serving multiple data streams having a same content; and
   a switching device, which switches between outputting one of the multiple data streams to the buffer, and after a switching decision has been made to output a newly selected data stream of the multiple data streams, discarding data from the buffer that does not belong to the newly selected data stream so as to eliminate switching lag.

9. The system as recited in claim 8, wherein the switching device switches between the multiple data streams in accordance with a decision strategy.

10. The system as recited in claim 8, wherein the decision strategy includes a measure of buffer delay.

11. The system as recited in claim 10, wherein the measure of the buffer delay is performed by evaluating buffer fullness and output bandwidth from the buffer.

12. The system as recited in claim 10, wherein the measure of buffer delay includes a buffer drain time determined for each stream.

13. The system as recited in claim 12, wherein the buffer drain time is estimated by $$\Delta_i = \frac{B_i}{R_{out}}$$

for each stream.

14. The system as recited in claim 13, wherein the switching device switches to a stream where the buffer drain time is smaller than a maximum tolerable delay.

15. The system as recited in claim 13, wherein a switching control device switches to a stream where the buffer drain time is smaller than a product of maximum tolerable delay and a weighting factor.

16. The system as recited in claim 13, wherein the switching device switches to a stream where the buffer drain time is largest.

17. A method for reducing switching lag in a system that selects from among multiple encodings of the same content to adapt to available bandwidth and meet delay constraints, comprising the steps of:
   serving multiple data streams having a same content with one buffer;
   switching between outputting one of the multiple data streams to the buffer, and after a switching decision has been made to output a newly selected data stream of the multiple data streams, discarding data from the buffer that does not belong to the newly selected data stream so as to eliminate switching lag.

18. The method as recited in claim 17, wherein the switching between the multiple data streams is performed in accordance with a decision strategy.

19. The method as recited in claim 18, wherein the decision strategy is modified to consider that each stream experiences a different buffer fullness.

20. The method as recited in claim 17, wherein the decision strategy includes measuring buffer delay.

21. The method as recited in claim 20, wherein measuring buffer delay includes evaluating buffer fullness and output bandwidth from the buffer.

22. The method as recited in claim 20, wherein the measuring of buffer delay includes determining for each stream a buffer drain time.

23. The method as recited in claim 20, wherein the determining for each stream a buffer drain time includes estimating buffer drain time by calculating $$\Delta_i = \frac{B_i}{R_{out}}$$

for each stream.

24. The system as recited in claim 23, wherein the switching includes switching to a stream where the buffer drain time is smaller than a maximum tolerable delay.

25. The method as recited in claim 23, wherein the switching includes switching to a stream where the buffer drain time is smaller than a product of maximum tolerable delay and a weighting factor.

26. The method as recited in claim 23, wherein the switching includes switching to a stream where the buffer drain time is largest.

27. A program storage device readable by a machine, tangibly embodying a program of instructions executable by the machine to perform method steps for reducing switching lag in a system that selects from among multiple encodings of the same content to adapt to available bandwidth and meet delay constraints, as recited in claim 17.

* * * * *